(12) United States Patent
Stoica et al.

(10) Patent No.: US 12,650,919 B2
(45) Date of Patent: Jun. 9, 2026

(54) MANAGEMENT OF METADATA IN A SOLID-STATE DRIVE VIA WRITE HEAT SEGREGATION

(71) Applicant: INTERNATIONAL BUSINESS MACHINES CORPORATION, Armonk, NY (US)

(72) Inventors: Radu Ioan Stoica, Zurich (CH); Dan Lazar, Houston, TX (US); Timothy J. Fisher, Cypress, TX (US); Nikolaos Papandreou, Thalwil (CH); Roman Alexander Pletka, Uster (CH); Charalampos Pozidis, Thalwil (CH); Aaron Daniel Fry, Richmond, TX (US); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/192,561

(22) Filed: Mar. 29, 2023

(65) Prior Publication Data

US 2024/0330173 A1 Oct. 3, 2024

(51) Int. Cl.
*G06F 12/00* (2006.01)
*G06F 12/02* (2006.01)
*G06F 12/0802* (2016.01)

(52) U.S. Cl.
CPC ...... *G06F 12/0246* (2013.01); *G06F 12/0802* (2013.01); *G06F 2212/45* (2013.01); *G06F* *2212/7201* (2013.01); *G06F 2212/7205* (2013.01); *G06F 2212/7207* (2013.01)

(58) Field of Classification Search
None
See application file for complete search history.

(56) References Cited

U.S. PATENT DOCUMENTS

| | | | |
|---|---|---|---|
| 2014/0250155 A1* | 9/2014 | Chen | G06F 16/1858 707/823 |
| 2017/0242788 A1 | 8/2017 | Ahmed et al. | |
| 2019/0286369 A1 | 9/2019 | Liu et al. | |
| 2019/0384506 A1* | 12/2019 | Shivanand | G06F 3/0659 |
| 2021/0103519 A1 | 4/2021 | Bahirat et al. | |
| 2022/0199172 A1 | 6/2022 | Nguyen et al. | |

* cited by examiner

*Primary Examiner* — Daniel D Tsui
(74) *Attorney, Agent, or Firm* — Jeffrey M. Ingalls

(57) ABSTRACT

A controller of the solid-state drive (SSD) maintains a logical-to-physical translation layer, wherein metadata for the logical-to-physical translation layer is stored in metadata pages in a flash memory of the SSD. The controller tracks a write heat of the metadata pages. The controller stores relatively more frequently accessed metadata pages in a non-durable cache of the SSD. The controller prioritized metadata write operations based on write heat of the metadata pages, such that a NAND flash block of the flash memory contains metadata pages with a similar write heat, wherein extents with similar write heats are grouped together into a stripe that stores extent data, and wherein write heats of the extents with the similar write heats do not differ from each other beyond a predetermined threshold.

20 Claims, 9 Drawing Sheets

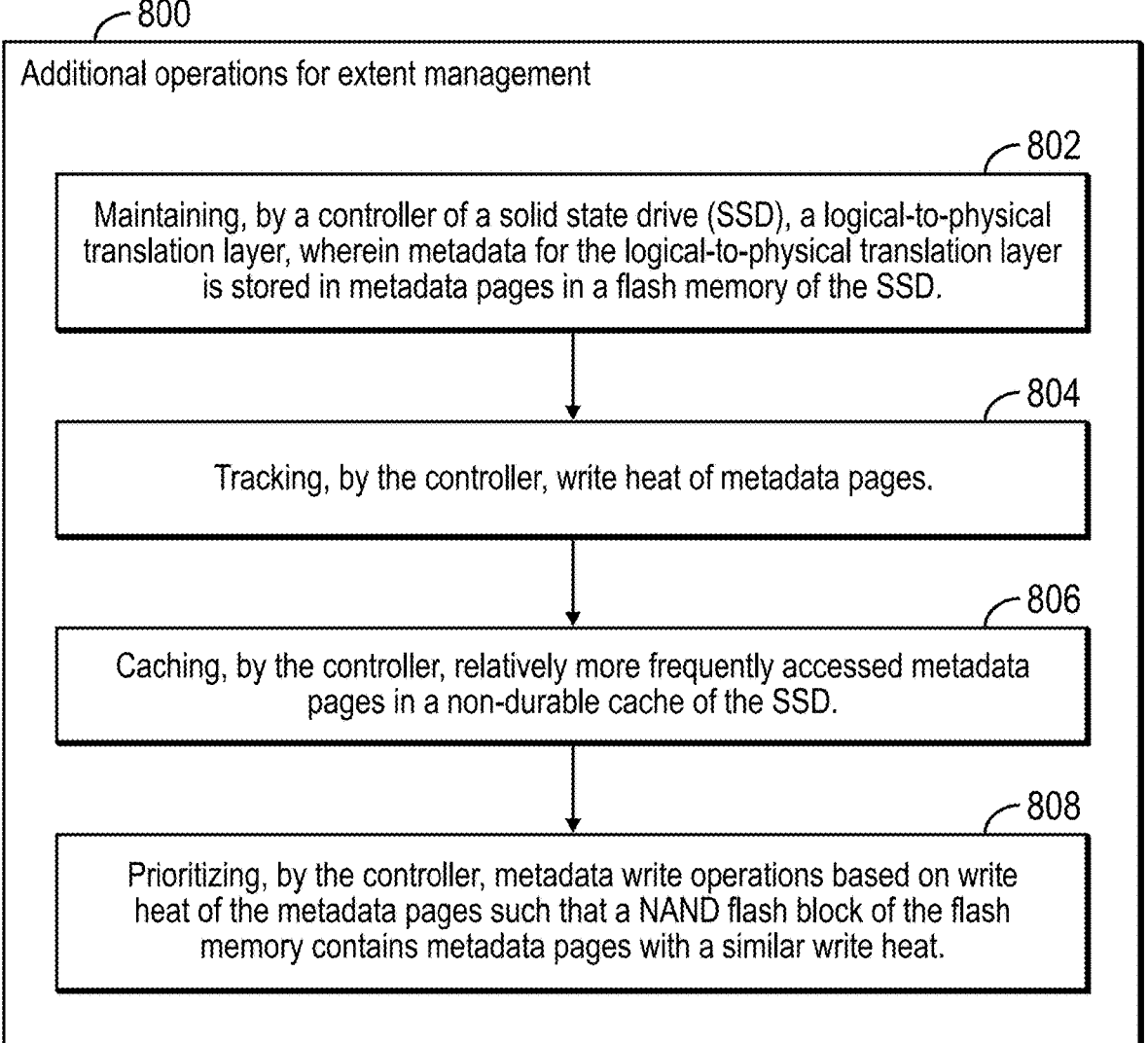

┌─ 800

Additional operations for extent management

┌─ 802

Maintaining, by a controller of a solid state drive (SSD), a logical-to-physical translation layer, wherein metadata for the logical-to-physical translation layer is stored in metadata pages in a flash memory of the SSD.

┌─ 804

Tracking, by the controller, write heat of metadata pages.

┌─ 806

Caching, by the controller, relatively more frequently accessed metadata pages in a non-durable cache of the SSD.

┌─ 808

Prioritizing, by the controller, metadata write operations based on write heat of the metadata pages such that a NAND flash block of the flash memory contains metadata pages with a similar write heat.

FIG. 8

MANAGEMENT OF METADATA IN A SOLID-STATE DRIVE VIA WRITE HEAT SEGREGATION

BACKGROUND

Embodiments relate to a method, system, and computer program product for management of metadata in a solid-state drive via write heat segregation.

Modern NAND Flash is a type of flash memory with an internal non-linear macro cell model, which provides an inexpensive and effective solution for solid state high-capacity memory. NAND Flash has the advantages of large capacity and fast rewriting speed, which is suitable for storing large amounts of data, and has been more and more widely used in the industry, such as in embedded products including digital cameras, compact USB flash drives, and in laptops, computers, and cellular phones.

The NAND structure provides very high cell density, allowing high storage density and fast write and erase speeds. However, garbage collection is necessary to clean the outdated data on flash memory. Garbage collection is very time-consuming and often becomes the performance bottleneck of flash memory.

Solid State Drives (SSDs) that include NAND flash operate on entire blocks of memory. Before writing to a memory cell, flash memory needs to be erased, which requires the application of a large voltage to the memory cells, which can only happen to an entire memory cell block at once. For example, if 1 KB of data is to be written to an SSD with an erase block size of 128 KB, the SSD needs to read 127 KB from the target block, erase the block and write the old data plus the new data back into the block.

Write amplification (WA) is an undesirable phenomenon associated with flash memory and SSDs where the actual amount of information physically written to the storage media is a multiple of the logical amount intended to be written. Because flash memory must be erased before it can be rewritten, with much coarser granularity of the erase operation when compared to the write operation, the process to perform these operations results in moving (or rewriting) user data and metadata more than once. Thus, rewriting some data requires an already used portion of flash to be read, updated, and written to a new location, together with initially erasing the new location if it was previously used at some point in time. Due to the way flash works, much larger portions of flash must be erased and rewritten than actually required by the amount of new data. This multiplying effect increases the number of writes required over the life of the SSD, which shortens the time the SSD can operate reliably. The increased writes also consume bandwidth to the flash memory, which reduces random write performance to the SSD. Many factors affect the write amplification of an SSD; some can be controlled by the user, and some are a direct result of the data written to and usage of the SSD.

In storage systems, one data block corresponds to a specific number of bytes of space on a logical storage device. The next level of logical space representation is an extent. An extent is a specific number of contiguous data blocks allocated for storing a specific type of information.

In storage systems, a stripe is comprised of multiple blocks that can be written in parallel to increase the aggregated write bandwidth, simplify NAND block management, and also provide a larger continuous space allocation where logical blocks can straddle over multiple flash pages. The size of a stripe in modern SSDs may comprises hundreds of megabytes to tens of gigabytes.

SUMMARY OF THE PREFERRED EMBODIMENTS

Provided are a method, a solid-state drive (SSD), and a computational device, in which a controller of the solid-state drive maintains a logical-to-physical translation layer, wherein metadata for the logical-to-physical translation layer is stored in metadata pages in a flash memory of the SSD. The controller tracks a write heat of the metadata pages. The controller stores relatively more frequently accessed metadata pages in a non-durable cache of the SSD. The controller prioritizes metadata write operations based on write heat of the metadata pages, such that a NAND flash block of the flash memory contains metadata pages with a similar write heat, wherein extents with similar write heats are grouped together into a stripe that stores extent data, and wherein write heats of the extents with the similar write heats do not differ from each other beyond a predetermined threshold.

In further embodiments, in response to user input/output (I/O) requests or other internal operations, metadata I/O operations are performed, including paging in or paging out the metadata pages from the flash memory, journal modifications to the metadata pages, and garbage collection of invalid metadata pages.

In yet further embodiments, the metadata pages containing changes not yet persisted to persistent flash storage are to be flushed before reclaiming journal space and are written in an order based on the write heat.

In additional embodiments, metadata pages matching a write heat range of a currently open stripe are evicted from the non-durable cache until NAND flash blocks of the currently open stripe are fully programmed.

In yet additional embodiments, during garbage collection, two or more metadata stripes are concurrently read, wherein the valid extents from the stripes are stored in the non-durable cache, and wherein the extents are sorted based on write heat, and subsequently written to the flash memory in heat order before the metadata stripes are reclaimed.

In certain embodiments, upon completing the garbage collection, a selected metadata stripe is filled with extents that match the write heat of the selected metadata stripe.

In further embodiments, the write heat of a metadata block measures how frequently the metadata block is written into, wherein the non-durable cache is a dynamic random access memory (DRAM), and wherein write amplification caused by paging of the metadata pages is reduced by varying periodically over time write heats of extents written to the flash memory.

In yet further embodiments, in journal modifications to metadata pages, changes to the logical-to-physical translation layer are journaled to allow postponing of flushing of extents to the flash memory, wherein extents are sorted based on write heat and eventually written to the flash memory to allow reclaiming of journal space.

In certain embodiments, a metadata stripe is filled with extents that match a write heat of a last logical to physical mapping metadata stripe.

BRIEF DESCRIPTION OF THE DRAWINGS

Referring now to the drawings in which like reference numbers represent corresponding parts throughout:

FIG. 8 illustrates a flowchart that shows additional operations for extent management for metadata, in accordance with certain embodiments.

DETAILED DESCRIPTION

Figure 1:
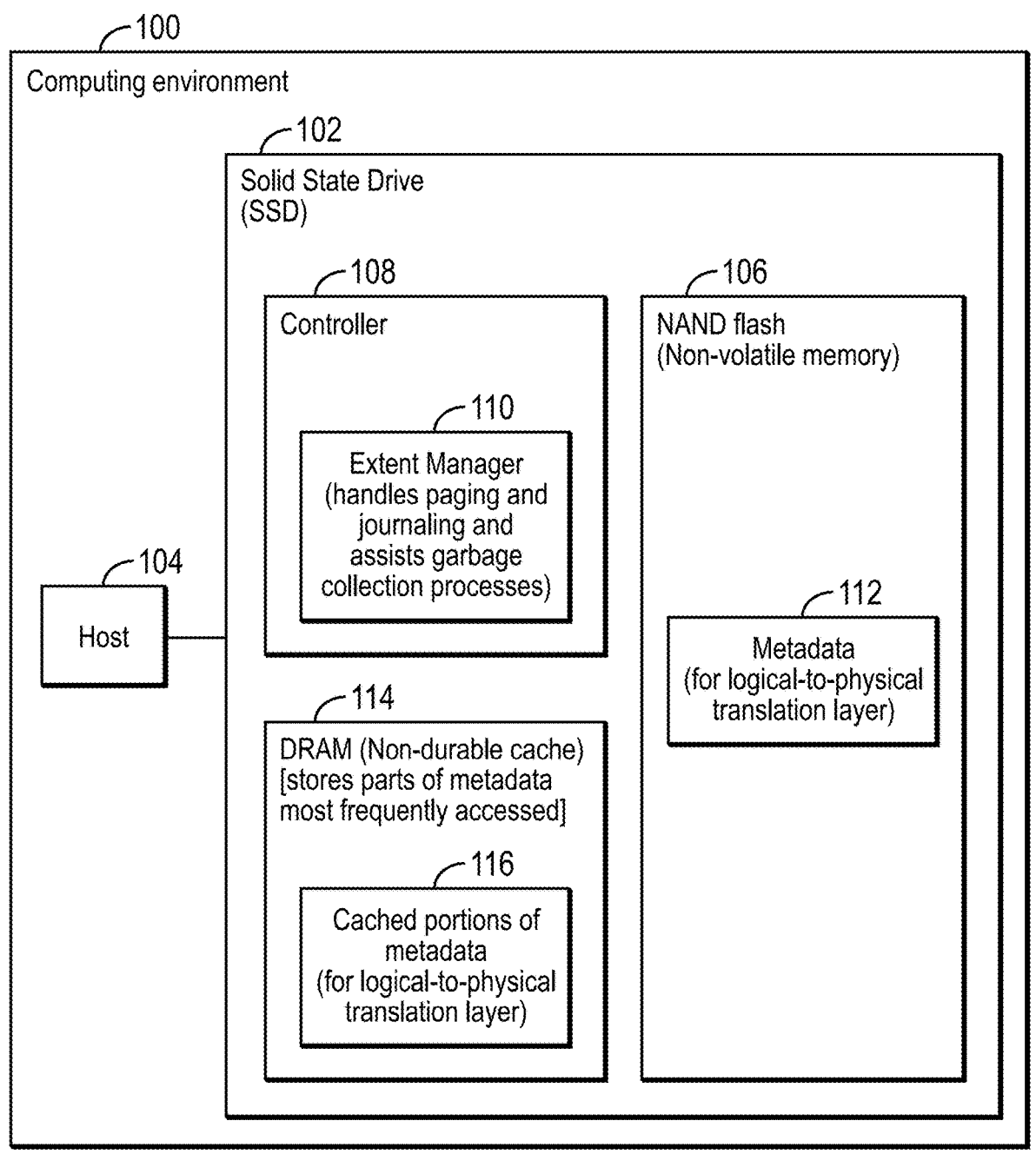
FIG. 1 illustrates a block diagram of a computing environment comprising a solid-state drive coupled to a host, in accordance with certain embodiments.

In the following description, reference is made to the accompanying drawings which form a part hereof and which illustrate several embodiments. It is understood that other embodiments may be utilized and structural and operational changes may be made.

NAND flash does not allow in-place updates as the technology requires erasing large blocks of data before the memory can be re-written. A general workaround is to implement an indirection layer that, upon a write, allows remapping a logical address to a new physical location on NAND flash. This technique avoids in-place updates which would require reading a full block, erasing the block, and finally re-programing the block. The drawback of the indirection layer, however, is that old invalid versions of the data are left behind, which must be eventually reclaimed through a background process called garbage collection. The garbage collection produces internal Input/Output (I/O) spikes which can result in uneven performance and latency and can make SSD performance seem unpredictable.

The indirection layer consists of a Logical-To-Physical Translation (LPT) table that maps each logical block address (LBA) to a physical location (for example, to a die, plane, lane, block, page, codeword). In modern high-capacity SSDs, especially those using QLC NAND flash and implementing capacity enhancement techniques such as hardware compression, the LPT metadata is usually too large to fully store in DRAM. Therefore, only a part of the LPT metadata is stored in the DRAM of the controller, while the rest is paged in or paged out on demand. To optimize performance and case management, the LPT metadata is preferably separated from user data, organized into larger size units called extents, and is stored in dedicated blocks that are configured in the single-bit (SLC) mode which offers the lowest read and write latencies. In some embodiments, to further reduce the latency of reading LPT extents, each flash page can contain multiple codewords, while the size of an extent is equal or less than the size of a flash page codeword. This allows the controller to read only part of a flash page using an I/O operation type that has reduced latency compared to a full page read operation. However, just like blocks storing user data, the blocks storing LPT extents cannot be updated in place and require periodic garbage collection. This leads to a situation where the user writes are amplified both by the internal garbage collection of the user data and also by the extent LPT writes and associated LPT extent garbage collection. To make matters worse, the user garbage collection also induces LPT writes meaning that the user garbage collection is also amplified by the extent LPT writes and extent LPT garbage collection.

Certain embodiments are an improvement on the traditional forms of write heat segregation that may be implemented by supporting multiple write streams. Certain embodiments provide a mechanism to reduce the write amplification due to metadata extent paging. The embodiments leverage the large extent cache of the SSD controller to re-order extent writes based on write heat. In the present context, the "write heat" of metadata refers to the rate (e.g., frequency) at which the metadata is updated (e.g., rewritten with new metadata). LPT extents that are considered "hot" tend to have a frequent updated rate, while LPT extents that are considered "cold" have an update rate slower than hot blocks. Even though the embodiments do not increase the amount of over-provisioning or increase the number of the write streams, extents of similar heat are written to full extent stripes which induces a form of write segregation and reduces write amplification. As a result, there in an improvement in the performance of computational devices that interact with an SSD.

It may be noted that write amplification is minimized when data of similar write heat is stored together. If hot and cold data are mixed, the hot data are quickly invalidated, while the cold data remains valid and requires relocation during garbage collection.

Exemplary Embodiments

FIG. 1 illustrates a block diagram of a computing environment 100 comprising a solid-state drive 102 coupled to a host 104, in accordance with certain embodiments.

The solid-state drive 102 may be located outside the host 104 (as shown in FIG. 1) or may be located internally within the host 104. Irrespective of whether the solid-state drive 102 is within or external to the host 104, the solid-state drive 102 is coupled to the host 104.

The solid-state drive 102 may be comprised of non-volatile memory 106, such as NAND memory, NOR memory or some other suitable non-volatile memory, and in FIG. 1, the non-volatile memory 106 is shown as NAND flash. In certain embodiments, the solid-state drive 102 may be capable of storing several terabytes of data or more. Certain embodiments may be applied to other types of non-volatile memory, phase change memory (PCM), a three-dimensional cross point memory, a resistive memory, nanowire memory, ferro-electric transistor random access memory (FeTRAM), magnetoresistive random access memory (MRAM) memory that incorporates memristor technology, spin transfer torque (STT)-MRAM, byte addressable random access non-volatile memory, etc.

In certain embodiments, the host 104 may be comprised of any suitable computational device, such as a personal computer, a mainframe, a telephony device, a smart phone, a storage controller, a blade computer, a processor with memory, etc. In certain alternative embodiments, the host 104 may communicate with the SSD 102 over a bus (such as a Peripheral Component Interconnect (PCIe), Serial Advanced Technology Attachment (SATA), Serial Attached Small Computer System Interface (SAS) or a network, such as the Internet, a storage area network (SAN), a local area network (LAN), etc. In another example, the interface and/or interconnect protocol may comply and/or be compatible with a NVMe (Non-Volatile Memory Host Controller Interface Express) protocol.

The solid-state drive 102 includes a controller 108, where the controller 108 includes an extent manager 110, where the extent manager 110 handles paging and journaling and assists garbage collection processes for metadata 112 stored in the NAND flash 106, where the metadata 112 is for the logical-to-physical translation layer that maps logical addresses to physical addresses.

The solid-state drive 102 also includes a non-durable cache, such as a dynamic random access memory (DRAM) 114. The DRAM 114 stores cached portions 116 of the metadata 112 and acts as a cache. The storage capacity of the DRAM 114 is considerably less than the storage capacity of the NAND flash 106. However, the DRAM 114 can be read from and written into much faster in comparison to the NAND flash 106.

Therefore, FIG. 1 illustrates certain embodiments in which an extent manager 110 of a controller 108 of an SSD 102 manages metadata comprising LPT entries, where the metadata is stored in the NAND flash 106 and parts of metadata are cached in the DRAM 114. The solid-state drive 102 may include both a general purpose Central Processing Unit (CPU) and a Field-programmable gate array (FPGA) and/or Application Specific Integrated Circuit (ASIC) that implements in hardware a data path.

Figure 2:
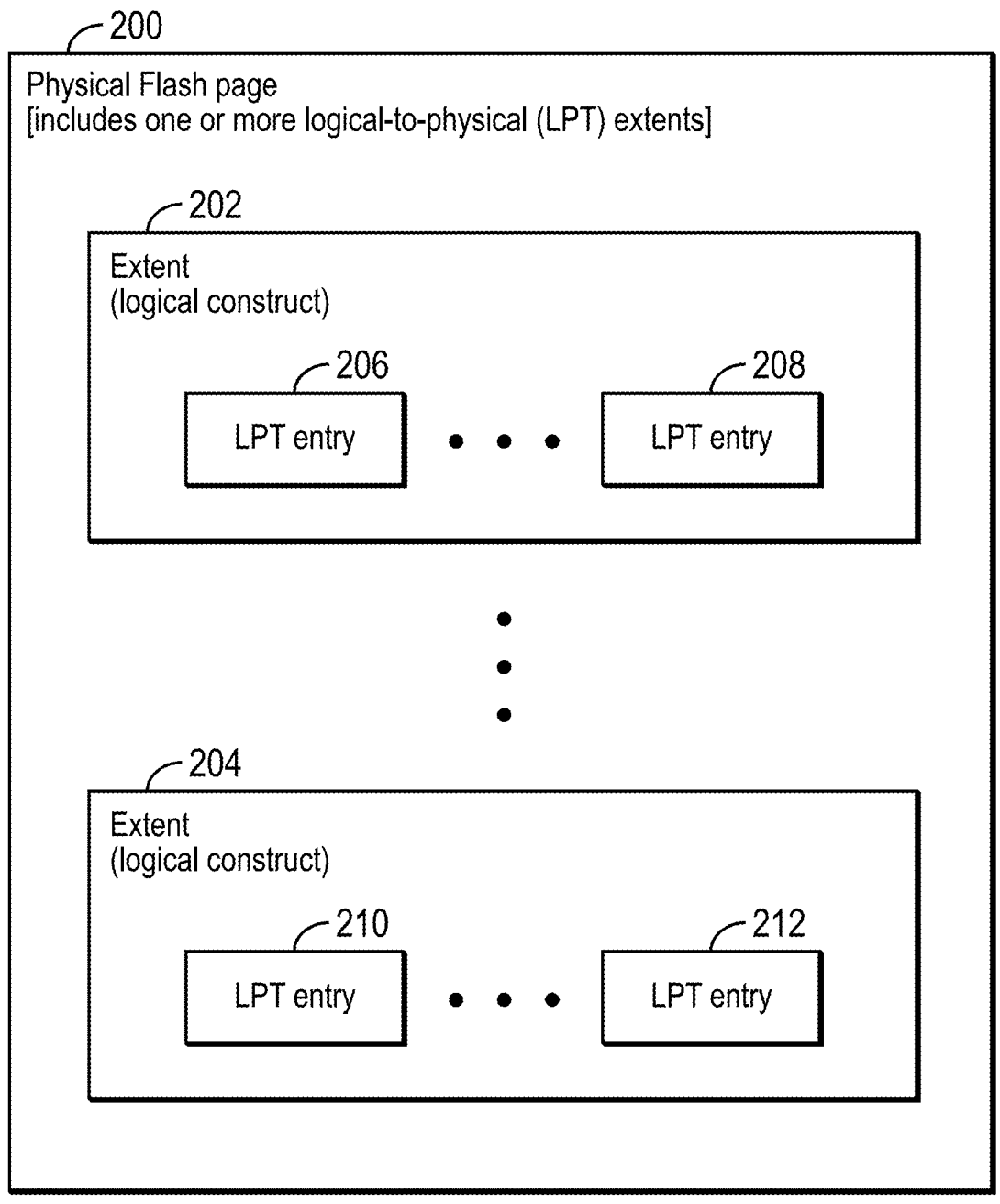
FIG. 2 illustrates a block diagram that shows how a physical flash page is comprised of a plurality of extents comprising logical-to-physical translation (LPT) entries, in accordance with certain embodiments.

FIG. 2 illustrates a block diagram 200 that shows how a physical flash page is comprised of a plurality of extents 202, 204 comprising logical-to-physical translation (LPT) entries 206, 208, 210, 212, in accordance with certain embodiments.

It should be noted that an extent is a logical construct where each extent has a plurality of LPT entries. Each physical flash page that is stored in the NAND flash 106 is comprised of a plurality of LPT entries.

In certain embodiments of a physical-to-logical mapping of the storage, the logical address space is mapped at a 16 kB granularity where each LPT entry identifies where 16 kB of logical data reside on flash. An extent contains a number of LPT entries (hundreds to thousands) such that the extent maps to a single codeword/half of a flash page that can be read with lower latency.

Each extent shown in FIG. 2 may have a header, where the header may include metadata fields such as extent number/ID, sequence/version number, etc.

Figure 3:
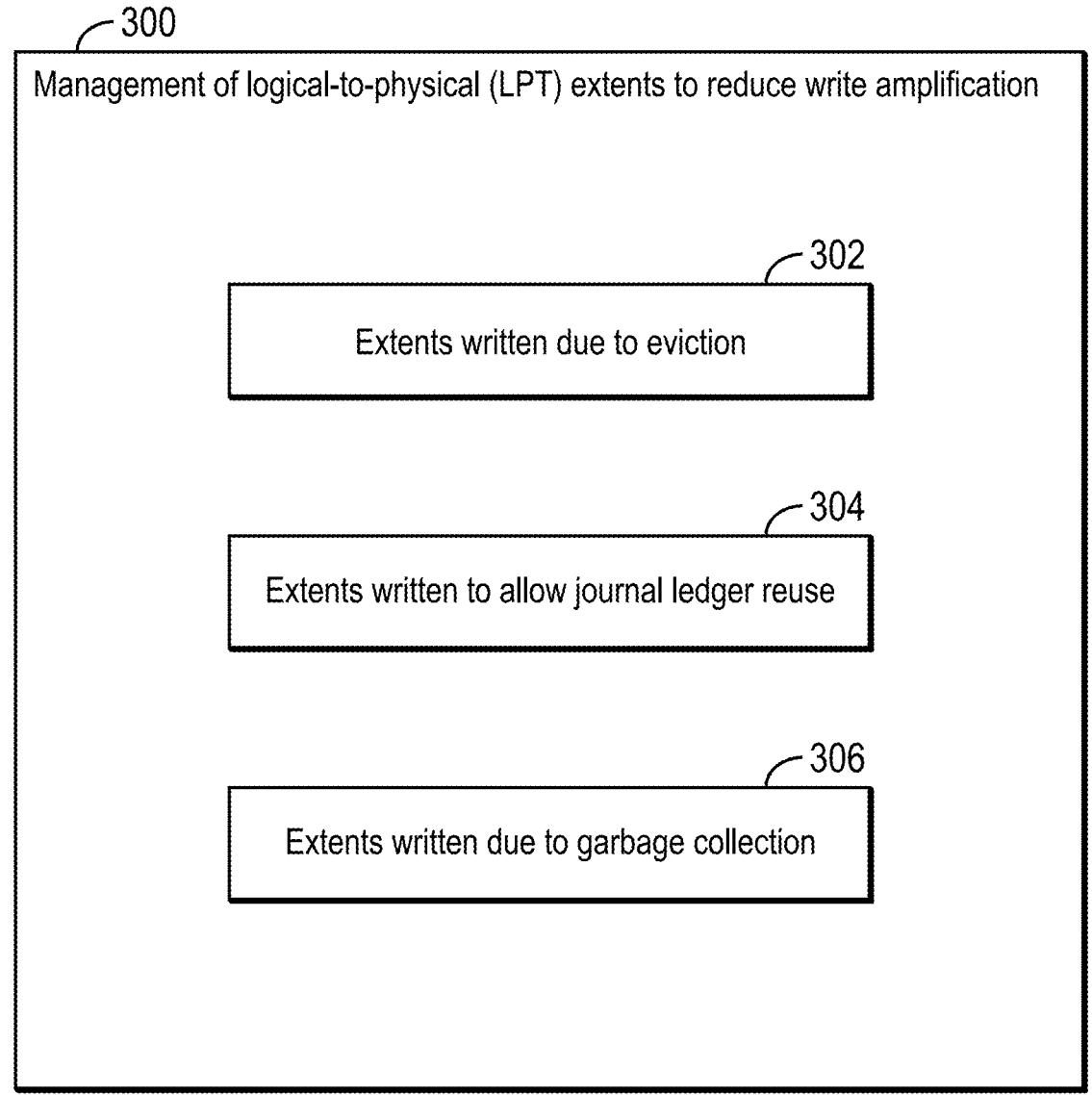
FIG. 3 illustrates a block diagram that shows the management of LPT extents to reduce write amplification, in accordance with certain embodiments.

FIG. 3 illustrates a block diagram 300 that shows the management of LPT extents to reduce write amplification, in accordance with certain embodiments.

Certain embodiments provide a new technique to write LPT extents such that the associated write amplification is minimized. First, the embodiments differentiate between extents flushed due to journal truncation, extent garbage collection, and eviction. There is a correlation between the motivation to write and the expected duration that extent will stay valid (i.e., the extent write heat).

For extents written due to eviction (as shown via reference numeral 306), the extents are the least infrequently read and written extents from the cache (i.e., low write heat, low read heat extents) but have a read and write heat higher than the extents that are not cached.

For extents written to allow journal ledger reuse (as shown via reference numeral 304), the extents are the most frequently updated extents (i.e., medium to high write heat extents). The higher the write heat of an extent, the higher the probability an extent must be written before journal ledger reclamation.

For extents written due to garbage collection (as shown via reference numeral 306), the extents have the lowest write heat but can have a high read heat.

Certain embodiments ensure that full extent stripes are written with a single extent heat or with the heat within a range and that the extent write streams do not get mixed. Secondly, when truncating a journal, certain embodiments flush extents in write heat order rather than in journal (i.e., chronologic) order. This requires multiple passes over the journal where certain embodiments flush extents with a heat in a certain range.

Thirdly, in scenarios it is not possible to complete a full extent stripe, certain embodiments preferably evict extents that have the following characteristics: (a) a low read heat, and (b) a write heat that matches the average heat of the partially written stripe. This ensures that the extent write process creates stripes where the extents have roughly the same update frequency.

Overall, these embodiments leverage the large extent cache and the large number of extents that are available for writing. Extent writes are re-ordered over time which produces a form of write heat segregation, while not requiring an increase in the number of write streams.

By grouping memory blocks of the metadata of same and/or similar write heat values, write heat segregation may be achieved. In particular, write heat segregating methods may group write hot memory pages together in certain memory blocks such as NAND flash while write cold memory pages are grouped together in separate memory blocks. The write amplification incurred by performing garbage collection is much lower for approaches implementing write heat segregation.

Figure 4:
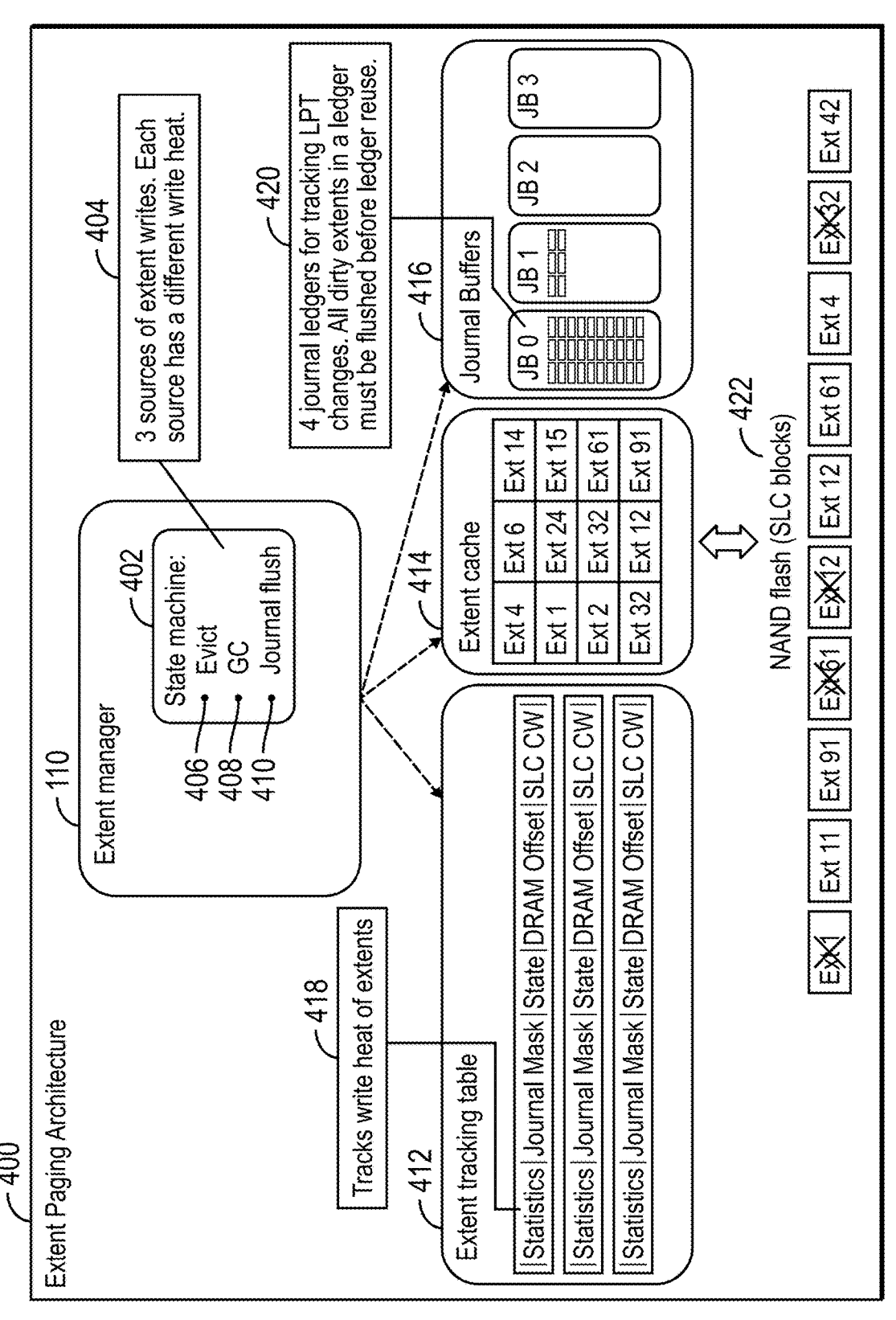
FIG. 4 illustrates a block diagram that shows an extent paging architecture, in accordance with certain embodiments.

FIG. 4 illustrates a block diagram 400 that shows an extent paging architecture, in accordance with certain embodiments.

The extent manager 110 maintain a state machine 402 that captures three sources of extent writes where each source has a different write heat (as shown via reference numeral 404). The state machine 402 may represent events such as eviction, garbage collection, and journal flush as shown via reference numerals 406, 408, 410 respectively.

The extent manager 110 maintains an extent tracking table 412, an extent cache 414 in the DRAM 114, and journal buffers 416. The extent tracking table tracks the write heat of extents (as shown via reference numeral 418). The extent cache 414 is shown to have 12 extents in FIG. 4, although in practice there may be thousands of extents. In certain embodiments there are two or more (or a different number) of journal ledgers for tracking LPT changes, where all dirty extents in a ledger are flushed before ledger reuse (as shown via reference numeral 420). Having multiple journal ledgers available allows the extent flushing and journal reclamation to overlap with modifications to the extents that result in new log records to a different journal ledger than the one in the process of being reclaimed.

The extent manager 110 may program certain single level cell (SLC) blocks 422 in the NAND flash from the extent cache 414. Promotion to the extent cache 414 from the SLC blocks 422 and demotion from extent cache 414 or deletion in the extent cache 414 or SLC blocks 422 are also managed by the extent manager 110.

Figure 5:
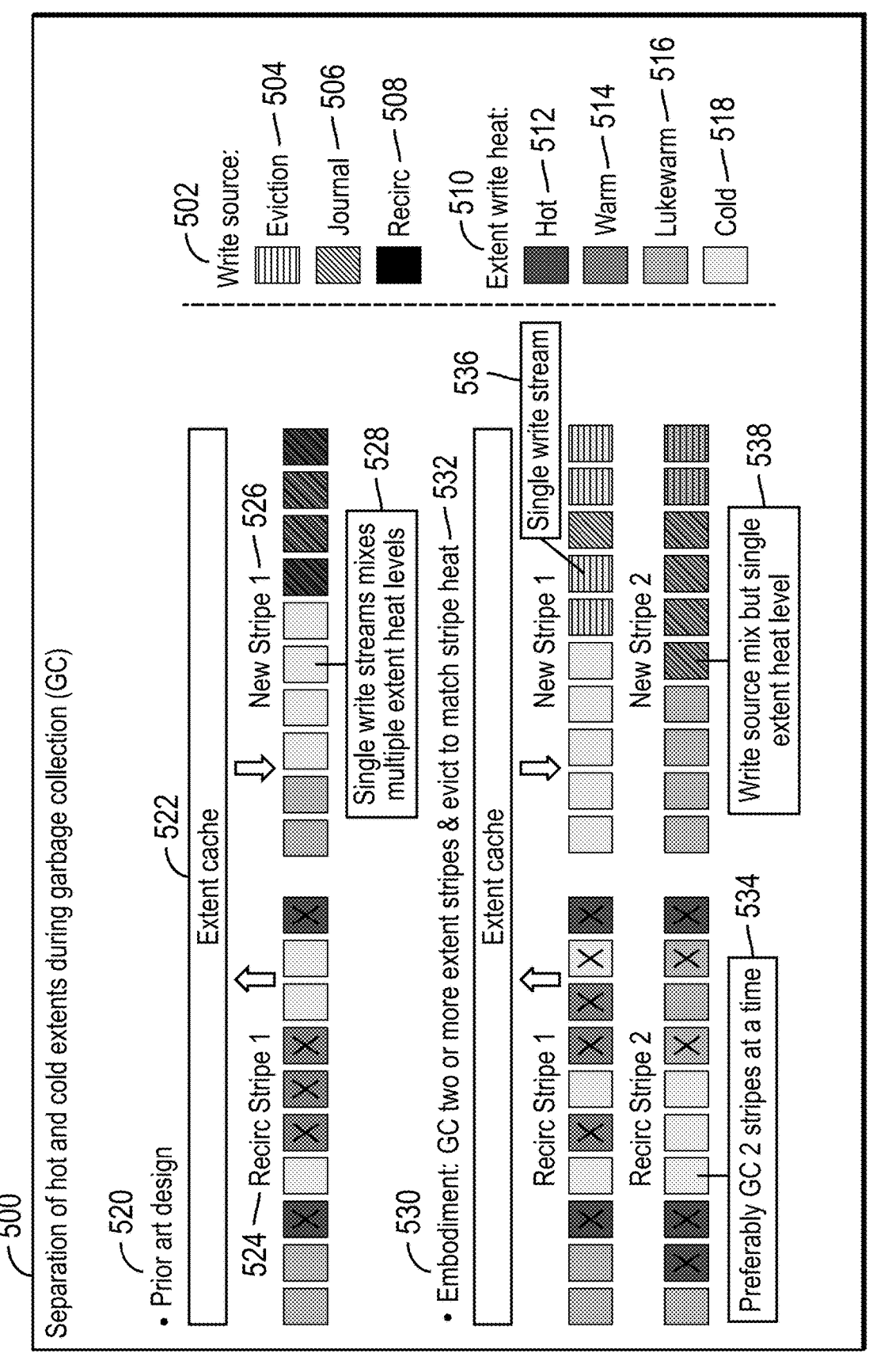
FIG. 5 illustrates a block diagram that shows how hot and cold extents are separated during garbage collection, in accordance with certain embodiments.

FIG. 5 illustrates a block diagram 500 that shows how hot and cold extents are separated during garbage collection, in accordance with certain embodiments. Garbage collection in the context of SSD and controllers may include the process of identifying blocks of data to be reclaimed for future usage and relocating all pages that are still valid therein.

FIG. 5 shown legends for the write source (eviction 504, journal 506 or recirc 508). If the write source is due to eviction, then the indication is via horizontal pattern. If the write source is due to journal, then the indication is via cross hatched pattern. If the write source is due to recirc than the indication is via solid fill.

The extent write heats 510 may be shown as hot 512, warn 514, lukewarm 516 or cold 518 as shown in FIG. 5.

In current prior art mechanisms (shown via reference numeral 520), in the extent cache 522 when a new stripe 526 is generated after removal of items in a recirc stripe 524, a single write stream mixes multiple extent heat levels for extents in the new stripe (as shown via reference numeral 528). This may lead to a high level of write amplification for the metadata.

In certain embodiments (shown via reference numeral 530) during garbage collection the valid extents from two or more extent stripes are read, the extents are stored in the controller cache, and then evicted in a way that an newly written extent stripe has a single heat level or similar heat levels (as shown via reference numeral 532).

In certain embodiments two stripes are garbage collected (GC) together at a time during garbage collection (as shown via reference numeral 534). The colder extents from the GC stripes are written to a new stripe, while the hotter extents from the GC stripes are written to another newly allocated stripe as shown via reference numeral 536, 538. In case there are insufficient GC extents to fill a full stripe, other extents might be written for other purposes such as to enable journal ledger reclamation or to evict extents from the cache.

Therefore, FIG. 5 shows that a single write stream may be comprised of a single extent heat level where the extents come from different sources. This may lead to a lower level of write amplification for the metadata in comparison to the prior art design 520. While two stripes are shown in the example shown in FIG. 5, in certain embodiments there may be a greater number of stripes that are garbage collected.

Figure 6:
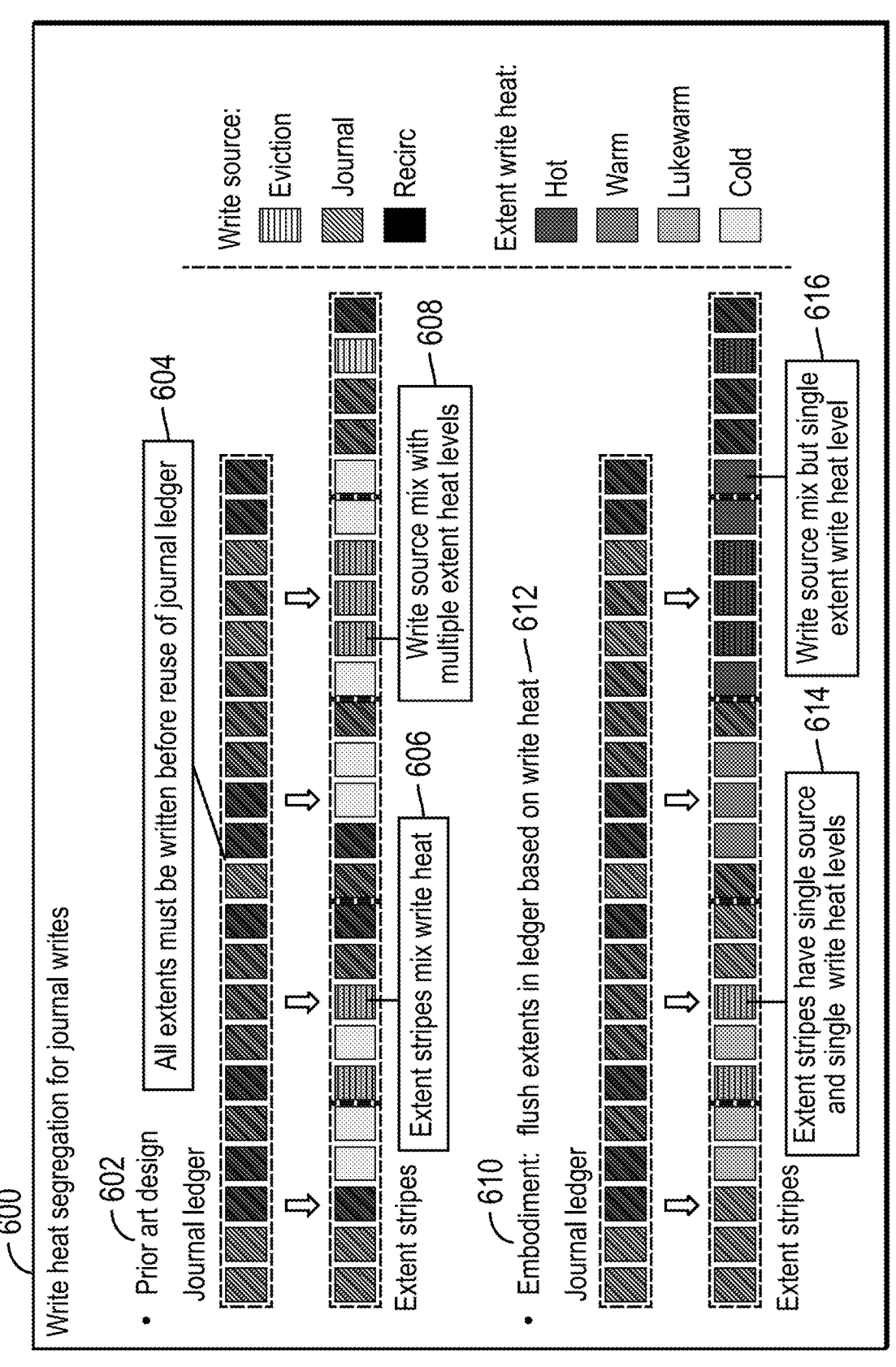
FIG. 6 illustrates a block diagram that shows write heat segregation for journal writes, in accordance with certain embodiments.

FIG. 6 illustrates a block diagram 600 that shows write heat segregation for journal writes, in accordance with certain embodiments.

The legend for FIG. 6 is similar to the legend shown for FIG. 5. In the prior art design, 602, all extents must be written before reuse of the journal ledger (as shown via reference numeral 604). The extent stripe mixes extents with vastly different extent heat levels (as shown via reference numerals 606, 608).

In certain embodiments (shown via reference numeral 610) extents in the ledger are flushed based on write heat (as shown via reference numeral 612). The extent stripes may have single source and single write heat levels (as shown 614), or multiple sources but single write heat level (as shown via reference numeral 616).

The journal ledger in FIG. 6 stores entries corresponding to changes to various extents, rather than actual extents and FIG. 6 should be interpreted accordingly. The extents referenced by the entries in the journal ledger must be all flushed to persistent media before reusing the journal ledger. The journal writes shown in FIG. 6 can be combined in certain embodiments with writes of similar heat from other sources.

FIG. 6 shows an example with 2 stripes that are garbage collected. In alternative embodiments a greater number of stripes may be garbage collected.

Figure 7:
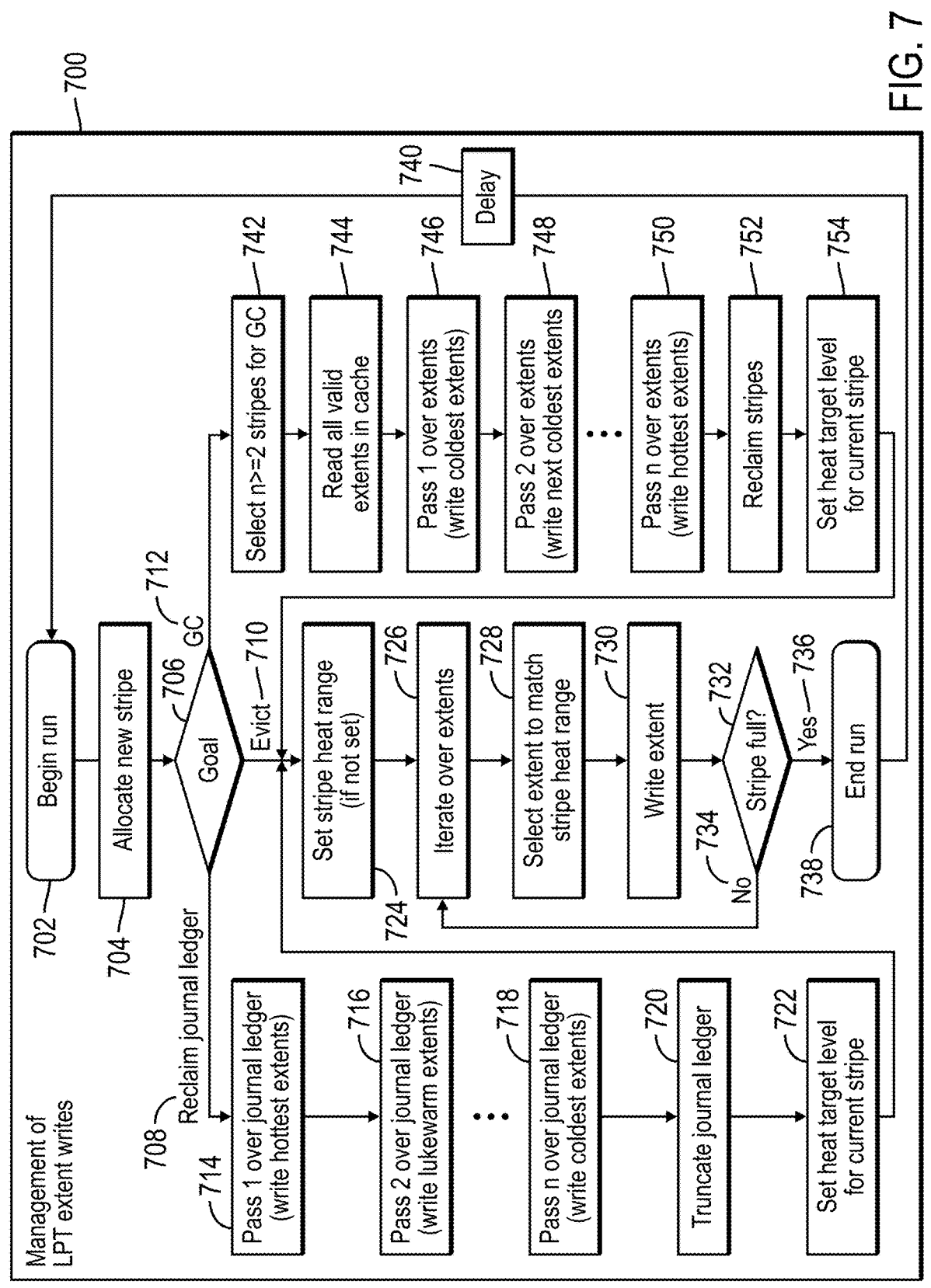
FIG. 7 illustrates a flowchart that shows operations for the management of LPT extent writes, in accordance with certain embodiments.

FIG. 7 illustrates a flowchart 700 that shows operations for the management of LPT extent writes, in accordance with certain embodiments. The operations shown in the flowchart 700 may be performed by the extent manager 110 that executes in the controller 108 of the solid-state drive 102.

Control starts at block 702 when an execution run begins and a new stipe is allocated (at block 704). The extent manager 110 determines (at block 706) what the next objective or goal is, where the goal may be to reclaim journal ledger 708, an eviction 710, or garbage collection (GC) 712. If the goal is determined to be to reclaim journal ledger 708, then control proceeds to block 714. Multiple passes are done over the journal ledger by first writing, for example, hottest extents (block 714), then less hot extents (e.g., lukewarm extents at block 716), and then finally the coldest extents (at block 718). In alternative embodiments, the write heat order can be from cold to hot extents. Then the journal ledger is truncated (at block 720) and the heat target level for the current stripe is set (at block 722) before control proceeds to the evict process (at block 710).

In the eviction process, the stripe heat range is set if it has not been set already (at block 724). Then an iteration is performed over extents starting at block 726. An extent is selected to match a stripe heat range (at block 728) and the extent written (at block 730). A determination is made at block 732 whether the stripe is now full, and if not ("N' branch 734) control returns to block 726.

If at block 732, a determination is made that the stripe is full, then proceeds to block 738 via the yes branch ("Y" 736) and the run is ended (at block 738). After a delay (block 740) a new run is started once again (at block 702).

If at block 706 the goal is determined to be garbage collection, then the garbage collection process 712 starts. Two or more stripes are selected for garbage collection (at block 742) and all valid extents in cache are read (at block 744). Multiple passes are performed with the coldest extents written first (at block 746), then the next coldest extents (at block 748), until the hottest extents are written in the last pass (at block 750). Then the stripes are reclaimed (at block 752) and the heat target level for the current stripe are set (at block 754) and the eviction process 710 is started.

Therefore FIG. 7 illustrates certain embodiments to show how metadata is managed in an SSD, by segregating stripes by heat target levels.

FIG. 8 illustrates a flowchart 800 that shows additional operations for extent management for metadata, in accordance with certain embodiments. The operations shown in the flowchart 800 may be performed by the extent manager 110 that executes in the controller 108 of the solid-state drive 102.

Control starts at block 802 in which a controller 108 of the solid-state drive 102 maintains a logical-to-physical translation layer, wherein metadata for the logical-to-physical translation layer is stored in metadata pages in a flash memory 106 of the SSD 102. The controller 108 tracks (at block 804) a write heat of the metadata pages.

From block 804 control proceeds to block 806 in which the controller 108 stores relatively more frequently accessed metadata pages in a non-durable cache 114 of the SSD 102. The controller prioritizes (at block 808) metadata write operations based on write heat of the metadata pages, such that a NAND flash block of the flash memory contains metadata pages with a similar write heat. Additionally, extents with similar write heats are grouped together into a stripe that stores extent data, wherein write heats of the extents with the similar write heats do not differ from each other beyond a predetermined threshold.

In further embodiments, in response to user input/output (I/O) requests or other internal operations, metadata I/O operations are performed, including paging in or paging out the metadata pages from the flash memory, journal modifications to the metadata pages, and garbage collection of invalid metadata pages. Metadata pages may be comprised of blocks or extents.

In certain embodiments, the metadata pages may represent LPT extents. The modifications to an extent are journaled, i.e., the difference between the old and new version of the extents are coalesced and written sequentially to flash. This approach allows extents to be modified in DRAM without the need to immediately also re-write them to flash in order to persist changes. Upon a restart, the journaled changes are read from the logs (journal ledgers) and applied to the out-of-date version of the extent pages from flash. This approach allows avoiding large writes (e.g., 8 kilobytes) at each modification of an extent. However, eventually the space reserved for the journal entries is exhausted. In order to reclaim the space, all dirty extents from DRAM that have uncommitted changes need to be persisted. Once all dirty extents in a journal buffer are written to flash, the journal entries are no longer required and the space can be reclaimed. The writing of new extent version invalidates the previous version of the extent stored in flash. Extents on flash may be in 3 states: (1) up to date extents (flash contains latest version); (2) out-of-date (Flash contains an older version. The latest version of the extent can be recreated by applying all journal changes to the out-of-date version; (3) Invalid extent versions, where an extent version is invalid if at least a newer version of the extent was written to flash.

Further details of garbage collection of invalid metadata pages are described next. It may be noted that the garbage college of metadata pages is in response to a low number of blocks available for writing rather than directly due to user writes.

The metadata pages that are to be flushed before reclaiming journal space are written in an order based on the write heat. Metadata pages matching the write heat of a currently open stripe are evicted from the non-durable cache until NAND flash blocks of the currently open stripe are fully programmed.

In yet additional embodiments, during garbage collection, two or more metadata stripes are concurrently read, wherein extents are stored in the non-durable cache, and wherein the extents are sorted based on write heat, and subsequently written to the flash memory in heat order before the metadata stripes are reclaimed. Upon completing the garbage collection, a selected metadata stripe is filled with extents that match the write heat of the selected metadata stripe.

In further embodiments, the write heat of an extent measures how frequently the extent is updated, wherein the non-durable cache is a dynamic random access memory (DRAM), and wherein write amplification caused by paging of the metadata pages is reduced by varying periodically over time the write heat of the extents written to the flash memory. In journal modifications to metadata pages, changes to the logical-to-physical translation layer are journaled to allow postponing of flushing of extents to the flash memory, wherein extents are sorted based on write heat and eventually written to the flash memory to allow reclaiming of journal space. In certain embodiments, a metadata stripe is filled with blocks that match a write heat of a last logical to physical mapping metadata stripe.

In certain embodiments of a physical-to-logical mapping of the storage, the logical address space is mapped at a 16 kB granularity where each LPT entry identifies where 16 kB of logical data reside on flash. An extent contains a number of LPT entries (hundreds to thousands) such that the extent maps to a single codeword/half of a flash page that can be read with lower latency.

Therefore FIGS. 1-8 illustrate certain embodiments for the management of metadata in a solid-state drive, by grouping extents of similar write heat level into the same stripe to reduce write amplification.

Certain embodiments provide improvements benefits compared to other write heat segregation techniques. For example, write heat segregation can be implemented by writing in parallel multiple write streams. However, each write stream requires additional resources to implement, including a dedicated persistent cache to store pending writes, an open stripe that increases space overhead (each stripe is multiple GB), and a larger reserve of ready-to-use blocks that can be used to allocate new stripes. The space overhead is larger when LPT metadata is stored in Single-Level Cell (SLC) flash as SLC blocks has four times lower storage capacity than Quad-Level Cell (QLC) blocks. Certain embodiments do not rely on implementing multiple parallel write streams but achieve write heat segregation by leveraging the large volatile cache of the SSD and journaling to delay extent writes and reorder the writes so that the write heat can be modulated over time.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 9:
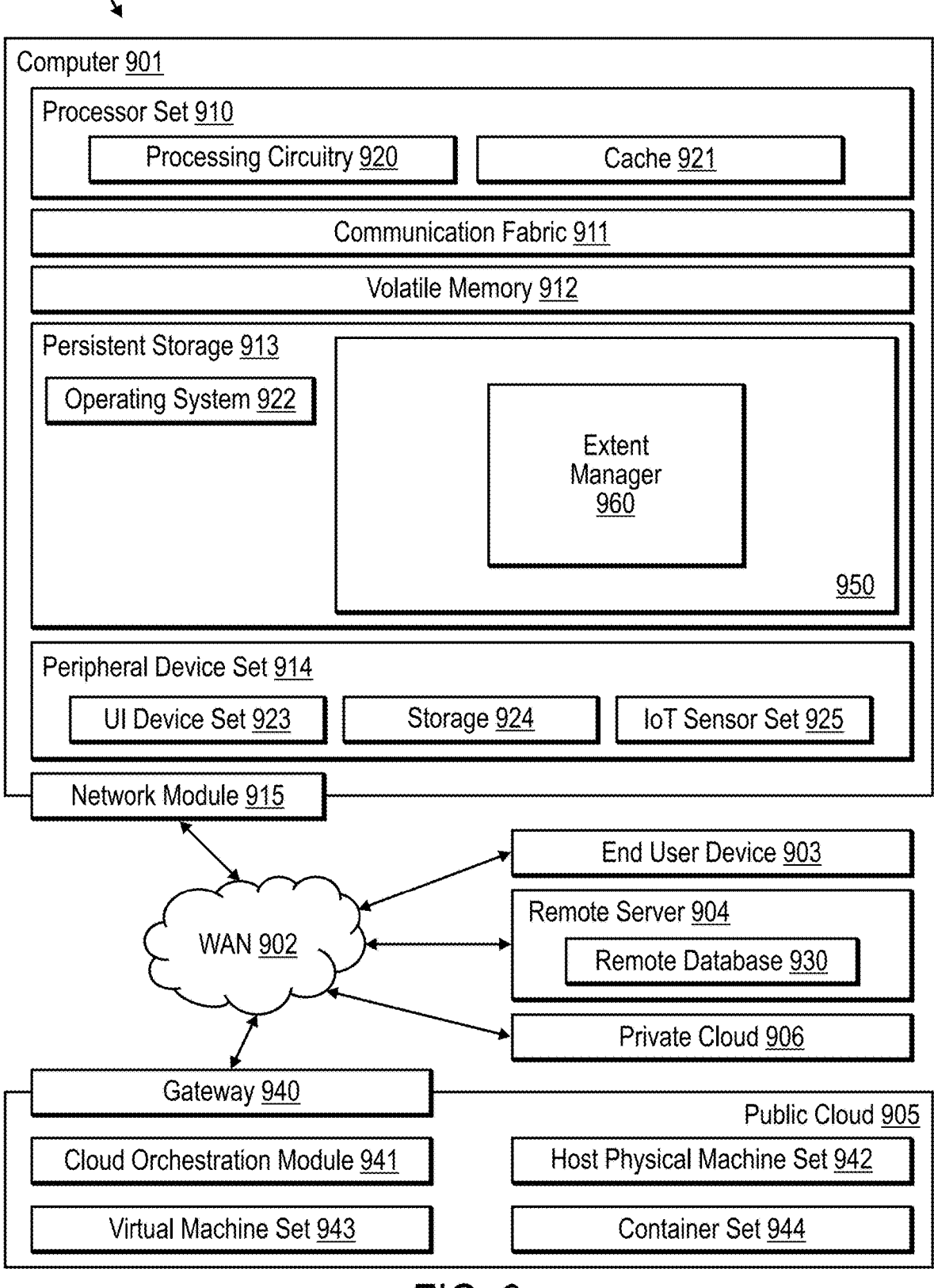
FIG. 9 illustrates a computing environment in which certain components of FIG. 1 may be implemented, in accordance with certain embodiments.

In FIG. 9, computing environment 900 contains an example of an environment for the execution of at least some of the computer code (block 950) involved in performing the operations of the extent manager 960 (the extent manager 960 is also shown via reference numeral 110 in FIG. 1).

In addition to block 950, computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and block 950, as identified above), peripheral device set 914 (including user interface (UI) device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

COMPUTER 901 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method may be distributed among multiple computers and/or between multiple locations. On the other hand, in this presentation of computing environment 900, detailed discussion is focused on a single computer, specifically computer 901, to keep the presentation as simple as possible. Computer 901 may be located in a cloud, even though it is not shown in a cloud in FIG. 9. On the other hand, computer 901 is not required to be in a cloud except to any extent as may be affirmatively indicated.

PROCESSOR SET 910 includes one, or more, computer processors of any type now known or to be developed in the future. Processing circuitry 920 may be distributed over multiple packages, for example, multiple, coordinated integrated circuit chips. Processing circuitry 920 may implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set may be located "off chip." In some computing environments, processor set 910 may be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods may be stored in block 950 in persistent storage 913.

COMMUNICATION FABRIC 911 is the signal conduction path that allows the various components of computer 901 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 912 is any type of volatile memory now known or to be developed in the future. Examples include dynamic type random access memory (RAM) or static type RAM. Typically, volatile memory 912 is characterized by random access, but this is not required unless affirmatively indicated. In computer 901, the volatile memory 912 is located in a single package and is internal to computer 901, but, alternatively or additionally, the volatile memory may be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 may be a read only memory (ROM), but typically at least a portion of the persistent storage allows writing of data, deletion of data and re-writing of data. Some familiar forms of persistent storage include magnetic disks and solid-state storage devices. Operating system 922 may take several forms, such as various known proprietary operating systems or open source Portable Operating System Interface-type operating systems that employ a kernel. The code included in block 950 typically includes at least some of the computer code involved in performing the inventive methods.

PERIPHERAL DEVICE SET 914 includes the set of peripheral devices of computer 901. Data communication connections between the peripheral devices and the other components of computer 901 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 923 may include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 may be persistent and/or volatile. In some embodiments, storage 924 may take the form of a quantum computing storage device for storing data in the form of qubits. In embodiments where computer 901 is required to have a large amount of storage (for example, where computer 901 locally stores and manages a large database) then this storage may be provided by peripheral storage devices designed for storing very large amounts of data, such as a storage area network (SAN) that is shared by multiple, geographically distributed computers. IoT sensor set 925 is made up of sensors that can be used in Internet of Things applications. For example, one sensor may be a thermometer and another sensor may be a motion detector.

NETWORK MODULE 915 is the collection of computer software, hardware, and firmware that allows computer 901 to communicate with other computers through WAN 902. Network module 915 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN 902 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901), and may take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 may be a client device, such as thin client, heavy client, mainframe computer, desktop computer and so on.

REMOTE SERVER 904 is any computer system that serves at least some data and/or functionality to computer 901. Remote server 904 may be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data may be provided to computer 901 from remote database 930 of remote server 904.

PUBLIC CLOUD 905 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs may be stored as images and may be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware, and firmware that allows public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 905 and private cloud 906 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:
1. A method, comprising:
maintaining, by a controller of a solid-state drive (SSD), a logical-to-physical translation layer, wherein metadata for the logical-to-physical translation layer is stored in metadata pages in a flash memory of the SSD;
tracking, by the controller, a write heat of the metadata pages;
caching, by the controller, relatively more frequently accessed metadata pages in a non-durable cache of the SSD; and prioritizing, by the controller, metadata write operations based on write heat of the metadata pages, such that a NAND flash block of the flash memory contains metadata pages with a similar write heat, wherein extents with similar write heats are grouped together into a stripe that stores extent data, and wherein write heats of the extents with the similar write heats do not differ from each other beyond a predetermined threshold.

2. The method of claim 1, the method further comprising:
in response to user input/output (I/O) requests or other internal operations, performing metadata I/O operations, including paging in or paging out the metadata pages from the flash memory, journal modifications to the metadata pages, and garbage collection of invalid metadata pages.

3. The method of claim 2, wherein the metadata pages containing changes not yet persisted to persistent flash storage are to be flushed before reclaiming journal space and are written in an order based on the write heat.

4. The method of claim 3, where metadata pages matching a write heat range of a currently open stripe are evicted from the non-durable cache until NAND flash blocks of the currently open stripe are fully programmed.

5. The method of claim 4, wherein during garbage collection, two or more metadata stripes are concurrently read, wherein valid extents from the metadata stripes are stored in the non-durable cache, and wherein the extents are sorted based on write heat, and subsequently written to the flash memory in heat order before the metadata stripes are reclaimed.

6. The method of claim 5, wherein, upon completing the garbage collection, a selected metadata stripe is filled with extents that match the write heat of the selected metadata stripe.

7. The method of claim 2, wherein the write heat of a metadata block measures how frequently the metadata block is written into, wherein the non-durable cache is a dynamic random access memory (DRAM), and wherein write amplification caused by paging of the metadata pages is reduced by varying periodically over time write heats of extents written to the flash memory.

8. The method of claim 2, wherein in journal modifications to metadata pages, changes to the logical-to-physical translation layer are journaled to allow postponing of flushing of extents to the flash memory, and wherein extents are sorted based on write heat and eventually written to the flash memory to allow reclaiming of journal space.

9. The method of claim 2, wherein a metadata stripe is filled with blocks that match a write heat of a last logical to physical mapping metadata stripe.

10. A solid-state drive (SSD), comprising:
a flash memory; and
a controller coupled to the flash memory, wherein the controller performs operations, the operations comprising:
maintaining a logical-to-physical translation layer, wherein metadata for the logical-to-physical translation layer is stored in metadata pages in the flash memory of the SSD;
tracking a write heat of the metadata pages;
caching relatively more frequently accessed metadata pages in a non-durable cache of the SSD; and
prioritizing, by the controller, metadata write operations based on write heat of the metadata pages, such that a NAND flash block of the flash memory contains metadata pages with a similar write heat, wherein extents with similar write heats are grouped together into a stripe that stores extent data, and wherein write heats of the extents with the similar write heats do not differ from each other beyond a predetermined threshold.

11. The solid-state drive of claim 10, the operations further comprising:

in response to user input/output (I/O) requests or other internal operations, performing metadata I/O operations, including paging in or paging out the metadata pages from the flash memory, journal modifications to the metadata pages, and garbage collection of invalid metadata pages.

12. The solid-state drive of claim 11, wherein the metadata pages containing changes not yet persisted to persistent flash storage are to be flushed before reclaiming journal space and are written in an order based on the write heat.

13. The solid-state drive of claim 12, where metadata pages matching a write heat range of a currently open stripe are evicted from the non-durable cache until NAND flash blocks of the currently open stripe are fully programmed.

14. The solid-state drive of claim 13, wherein during garbage collection, two or more metadata stripes are concurrently read, wherein valid extents from the metadata stripes are stored in the non-durable cache, and wherein the extents are sorted based on write heat, and subsequently written to the flash memory in heat order before the metadata stripes are reclaimed.

15. The solid-state drive of claim 14, wherein, upon completing the garbage collection, a selected metadata stripe is filled with extents that match the write heat of the selected metadata stripe.

16. A computational device, comprising:

a processor; and a solid-state drive (SSD) coupled to the processor, the solid-state drive comprising:

a flash memory; and a controller coupled to the flash memory, wherein the controller performs operations, the operations comprising:

maintaining a logical-to-physical translation layer, wherein metadata for the logical-to-physical translation layer is stored in metadata pages in the flash memory of the SSD;

tracking a write heat of the metadata pages;

caching relatively more frequently accessed metadata pages in a non-durable cache of the SSD; and prioritizing, by the controller, metadata write operations based on write heat of the metadata pages, such that a NAND flash block of the flash memory contains metadata pages with a similar write heat, wherein extents with similar write heats are grouped together into a stripe that stores extent data, and wherein write heats of the extents with the similar write heats do not differ from each other beyond a predetermined threshold.

17. The computational device of claim 16, the operations further comprising:

in response to user input/output (I/O) requests or other internal operations, performing metadata I/O operations, including paging in or paging out the metadata pages from the flash memory, journal modifications to the metadata pages, and garbage collection of invalid metadata pages.

18. The computational device of claim 17, wherein the metadata pages containing changes not yet persisted to persistent flash storage are to be flushed before reclaiming journal space and are written in an order based on the write heat.

19. The computational device of claim 18, where metadata pages matching a write heat range of a currently open stripe are evicted from the non-durable cache until NAND flash blocks of the currently open stripe are fully programmed.

20. The computational device of claim 19, wherein during garbage collection, two or more metadata stripes are concurrently read, wherein valid extents from the metadata stripes are stored in the non-durable cache, and wherein the extents are sorted based on write heat, and subsequently written to the flash memory in heat order before the metadata stripes are reclaimed.

* * * * *